(12) United States Patent
Herrwerth et al.

(10) Patent No.: US 8,084,633 B2
(45) Date of Patent: Dec. 27, 2011

(54) ORGANICALLY MODIFIED SILOXANES AND THEIR USE FOR PRODUCING PREPARATIONS FOR WATER-REPELLENT IMPREGNATIONS

(75) Inventors: Sascha Herrwerth, Essen (DE); Frank Koenig, Gelsenkirchen (DE); Andrea Lohse, Bottrop (DE)

(73) Assignee: Evonik Goldschmidt GmbH, Essen (DE)

( * ) Notice: Subject to any disclaimer, the term of this patent is extended or adjusted under 35 U.S.C. 154(b) by 902 days.

(21) Appl. No.: 12/044,210

(22) Filed: Mar. 7, 2008

(65) Prior Publication Data

US 2008/0216708 A1    Sep. 11, 2008

(30) Foreign Application Priority Data

Mar. 8, 2007  (DE) .......................... 10 2007 011 251

(51) Int. Cl.
*C07F 7/08* (2006.01)
(52) U.S. Cl. ...................................................... 556/439
(58) Field of Classification Search ........................ None
See application file for complete search history.

(56) References Cited

U.S. PATENT DOCUMENTS 5,744,203 A * 4/1998 Harada et al. ................ 428/1.23

* cited by examiner

*Primary Examiner* — Daniel Sullivan
*Assistant Examiner* — Yevegeny Valenrod
(74) *Attorney, Agent, or Firm* — Frommer Lawrence & Haug LLP

(57) ABSTRACT

The invention relates to organomodified siloxane compounds of the general formula (I)

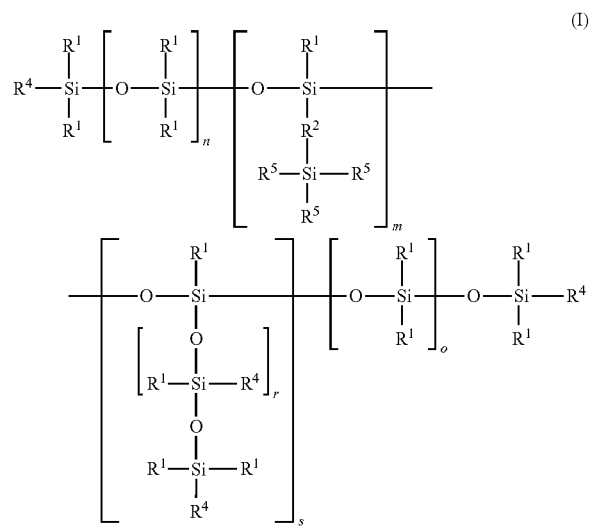

the use of at least one of these compounds for producing aqueous preparations for the water-repellent impregnation of organic or inorganic materials.

17 Claims, No Drawings

ORGANICALLY MODIFIED SILOXANES AND THEIR USE FOR PRODUCING PREPARATIONS FOR WATER-REPELLENT IMPREGNATIONS

This application claims benefit under 35 U.S.C. 119(a) of German patent application DE 10 2007 011 251.5, filed on 8 Mar. 2007.

Any foregoing applications, including German patent application DE 10 2007 011 251.5, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

Citation or identification of any document in this application is not an admission that such document is available as prior art to the present invention.

The present invention relates to novel organically modified siloxanes and their use for producing preparations for water-repellent impregnations, e.g. for mineral building materials, based on organomodified siloxane compounds which simultaneously contain alkoxy groups and organic radicals which have carboxylic ester functions and are bound to Si atoms in the molecule.

Organosilanes or organosiloxanes have been used for many years to impregnate porous mineral building materials in order to protect them against penetration of water. In this hydrophobicizing treatment, it is particularly important that the active compounds penetrate deep into the building material and combine chemically or physically with the building material.

Penetration into the building material is favoured when very low molecular weight compounds are used as active organosilicon compounds. The penetration depth can additionally be improved by the concomitant use of organic solvents which evaporate after the treatment of the building material.

A high reactivity is achieved when organoalkoxysilanes and/or organoalkoxysiloxanes which condense in the presence of moisture and can react with the building material are used as organosilicon compounds. In this reaction, the alcohol corresponding to the alkoxy group is eliminated and evaporates into the atmosphere.

U.S. Pat. No. 4,486,476 discloses such a preparation comprising organoalkoxysilanes which comprises siloxane units of the general formula

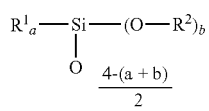

where
$R^1$ is an alkyl or aryl radical,
$R^2$ is an alkyl radical having from 1 to 4 carbon atoms,
a is from 0.8 to 1.5 and
$b \leq 2$.

This preparation is characterized in that it comprises
a) from 1 to 20% by weight of a mixture of organoalkoxysiloxanes comprising siloxane units of the abovementioned formula, which mixture comprises from 25 to 75% by weight of a siloxane whose value b=0.1 to 0.5 and from 75 to 25% by weight of a siloxane whose value b=0.8 to 2.0, where $a+b \leq 3$,
b) from 80 to 99% by weight of a solvent which is immiscible with water and
c) if appropriate, condensation catalysts known per se.

The significant feature of this preparation is thus the impregnation is not carried out using an organoalkoxysiloxane whose molecular weight distribution has essentially only a single maximum but instead using a mixture of organoalkoxysiloxanes which is characterized by varying degrees of condensation.

This ensures a high penetration depth combined with a high effectiveness, in particular on alkaline building materials, and a good, visible water repellent effect.

These preparations can be improved essentially only in terms of the penetration depth which can be achieved in practice. The penetration depth is influenced by essentially three factors, namely the solvents used, the porosity of the building materials and the care with which these preparations are employed in practice. Improved preparations for the impregnation therefore have to be assessed, in particular, by their penetration behavior.

As a result of increased environmental awareness, the use of organic solvents is increasingly considered to be undesirable. Efforts have therefore been made, in particular, to develop comparable preparations based on water.

Further development work has led to a process which is subject matter of U.S. Pat. No. 4,781,950. This patent text relates to a process for impregnating mineral building materials, in particular masonry, with aqueous solutions of silanols and/or siloxanols which are prepared at the point of use by hydrolysis of alkoxysilanes and/or alkoxysiloxanes, in which compounds comprising siloxane units of the general formula

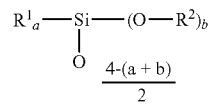

where
$R^1$ is an alkyl radical having from 1 to 8 carbon atoms, with on average at least 90% of the radicals $R^1$ being alkyl radicals having from 1 to 4 carbon atoms,
$R^2$ is a methyl or ethyl radical,
a is from 0 to 1.5,
b is from 1.0 to 4.0,
a+b is from 2.0 to 4.0,
are used as alkoxysilanes and/or alkoxysiloxanes and are hydrolyzed continuously in an amount corresponding to consumption and the solution obtained is applied to the mineral building material within a period of from 3 to 30 minutes after mixing of the reactants.

In this procedure, a high penetration of the aqueous preparations into the mineral building material comparable to the penetration achieved using solvent-containing preparations is achieved.

However, owing to the instability of these aqueous solutions on storage, they have to be, as proposed in DE-C-36 27 060 (U.S. Pat. No. 4,781,950), prepared at the point of use.

The European patent application EP-A-0 234 024 (U.S. Pat. No. 4,648,904) describes an aqueous silane emulsion consisting essentially of a) from 1 to 40% by weight of a hydrolyzable silane which has a molecular weight of up to about 500 and has the general formula $R_nSi(R')_{4-n}$, where R is a halogenated or unhalogenated hydrocarbon radical having from 1 to 20 carbon atoms, R' is an alkoxy radical having from 1 to 3 carbon atoms, a halogen, amino or carboxyl radical, n=1 or 2, or oligomers of such silanes and b) from 0.5 to 50% by weight, based on the silane, of an emulsifier having an HLB (hydrophile-lipophile balance) determined by the Griffin method of from 4 to 15 and c) water, for hydrophobicizing ceramic material.

As particularly preferred silane, mention is made of octyltriethoxysilane. Emulsions of such silanes in which the radical R has more than 6 carbon atoms actually have increased stability since the hydrolysis rate of these reactive silanes is reduced.

However, a disadvantage is that the hydrolysis of these silanes in the building material inevitably also occurs correspondingly slowly and has to be catalyzed in a suitable way. In some building materials, e.g. fresh concrete, this is made possible by their high alkalinity. However, it is not possible in neutral or weakly alkaline building materials such as calcined clinker and numerous types of natural stone. However, without such catalysis, the silanes are not anchored to the surface of the building material. The silanes can evaporate from the surface or be removed mechanically. This results in the surface becoming depleted in silanes and thus in a reduction in the hydrophobicization. Consequently, the water repellent effect is weak or not present at all. The water absorption capability of the depleted surface layer is high, so that it is just this surface layer which is particularly exposed to weathering and mechanical attack that is insufficiently protected. These preparations can thus be used only for particular building materials.

An impregnation emulsion having a good action on alkaline and neutral building materials is described in U.S. Pat. No. 5,091,002. It contains from 2.5 to 25% by weight of an alkoxysilane of the general formula

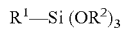

where $R^1$ is an alkyl radical having from 3 to 12 carbon atoms and $R^2$ is a methyl or ethyl radical, from 2 to 20% by weight of an alkoxysiloxane comprising siloxane units of the general formula

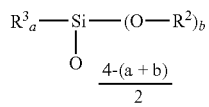

where $R^3$ is an alkyl radical having from 1 to 6 carbon atoms, a is from 0.8 to 1.2 and b is from 0.2 to 1.2, from 0.01 to 5% by weight of an emulsifier, from 0.01 to 0.1% by weight of fillers having an effective surface area of at least 40 m²/g and from 49.9 to 95.48% by weight of water.

This impregnation emulsion generally displays good repellent effects both on alkaline mineral substrates and neutral mineral substrates. If the effects which can be achieved by means of this emulsion are awarded grades according to the evaluation scheme described below, it is found that the best results are achieved when a) the emulsifier content is low, b) hydrophobicized silica is present in the emulsion and c) a curing catalyst for the organosilicon compounds is present in the emulsion.

However, if the emulsifier content is low, the stability of the impregnation emulsion is ensured for only a limited time. If hydrophobicized silica is present in the emulsion, this frequently settles out during storage and makes careful stirring at the point of use, i.e. the building site, necessary.

This care is not always expended. Finally, the curing catalyst limits the time for which the emulsion remains processible and can lead to premature curing of the active compound in the emulsion during storage.

Further development work has led to a process which is subject matter of DE-A-40 29 640 (U.S. Pat. No. 5,196,054). This is concerned with the problem of improving the use properties of such impregnation emulsions, in particular the problem of producing storage-stable emulsions which lead to a high repellent effect within a short time, in general within one day, without addition of hydrophobicized silica or specific curing catalysts being necessary. These preparations are emulsions containing mixtures of, inter alia, various siloxane compounds which cure by means of a condensation reaction and in the process eliminate volatile alcohols (volatile organic compounds, VOC) in amounts of from 250 to 500 g/l.

This leads to a low degree of utilization of the active compound and increased pollution of the environment. In addition, the storage stability of aqueous systems/emulsions is restricted by the elimination of alcohol, since the emulsions are broken by the free alcohol. As a result, the active compounds condense and thus no longer penetrate sufficiently during later use.

Due to increased environmental awareness, the use of such VOC-rich formulations is increasingly considered to be undesirable.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right and hereby disclose a disclaimer of any previously described product, method of making the product or process of using the product.

It was therefore an object of the present invention to provide an alternative system which hydrophobicizes the substrate and preferably does not have one or more of the above-mentioned disadvantages of the prior art. The system should preferably penetrate well into a mineral or organic building material, display a good repellent effect and/or cure independently of the nature of the substrate.

It has surprisingly been found that this object can be achieved by the use of organomodified siloxane compounds which simultaneously contain alkoxy groups and organic radicals which have carboxylic ester functions in the molecule.

The present invention accordingly provides organomodified siloxane compounds of the general formula (I),

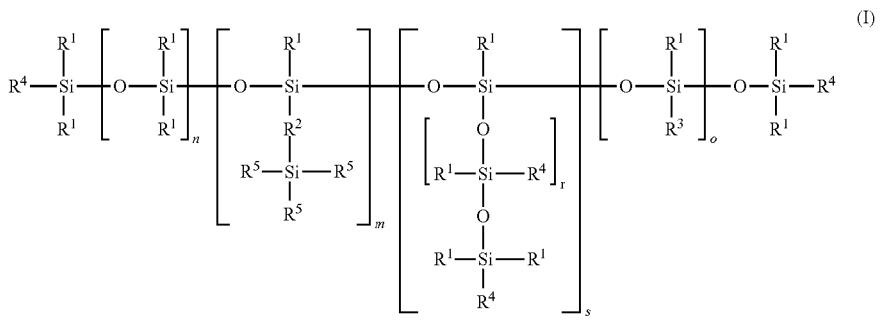

where
the radicals $R^1$ are identical or different radicals selected from the group consisting of linear or branched, saturated or monounsaturated or polyunsaturated alkyl, aryl, alkylaryl, arylalkyl radicals and haloalkyl groups having from 1 to 20 carbon atoms,
the radicals $R^2$ are identical or different organic radicals which have from 1 to 20 carbon atoms and may contain heteroatoms,
the radicals $R^3$ are organic radicals having carboxylic ester functions as shown in the formula (II),

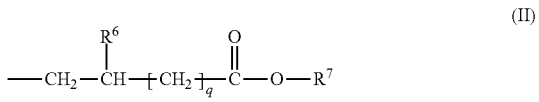

the radicals $R^6$ are identical or different linear or branched, saturated or monounsaturated or polyunsaturated alkyl, aryl, alkylaryl or arylalkyl radicals having from 1 to 20 carbon atoms and
the radicals $R^7$ are identical or different linear or branched, saturated or monounsaturated or polyunsaturated alkyl, aryl, alkylaryl or arylalkyl radicals having from 1 to 20 carbon atoms and
q is from 0 to 11,
the radicals $R^4$ are each, independently of one another, $R^1$, $-R^2-Si(R^5)_3$ or $R^3$,
the radicals $R^5$ are identical or different, saturated or unsaturated alkyl, alkoxy, aryl or aryloxy radicals having from 1 to 20 carbon atoms, with the proviso that at least one radical $R^5$ is an alkoxy group,
n is from 1 to 200,
m is from 0 to 20, with the proviso that m is 0 only when $R^4$ is the radical $-R^2-Si(R^5)_3$ and otherwise m≧1,
o is from 0.2 to 20,
r is from 0 to 100,
s is from 0 to 5,
where the units denoted by the indices m, n, o, r and s can be distributed in any order in the compounds.

The invention further provides concentrates of aqueous emulsions for the water-repellent impregnation of inorganic and organic substrates comprising
a) from 10 to 80% by weight, preferably from 20 to 60% by weight, in particular from 30 to 50% by weight, of the general formula (I),
b) from 0.5 to 10% by weight of an emulsifier or emulsifier mixture, preferably from 1.0 to 5.0% by weight, in particular from 2.0 to 3.5% by weight,
c) from 10 to 89.5% by weight of water and, if appropriate,
d) from 0 to 0.5% by weight of preservative.

The present invention likewise provides for the use of at least one of the compounds of Claims 1 to 8 for producing aqueous preparations for the water-repellent impregnation of inorganic or organic substrates, in particular porous mineral building materials.

In addition, the present invention provides aqueous preparations for the water-repellent impregnation of inorganic or organic substrates, which comprise
a) from 10 to 80 parts by weight of compounds according to any of Claims 1 to 8,
b) from 0.5 to 10 parts by weight of an emulsifier or emulsifier mixture and
c) water.

Possible further embodiments of the present invention may be derived from the claims.

The compounds of the invention have the advantage that they can penetrate well into mineral or organic building materials so that high penetration depths can be achieved when using the compounds of the invention or the emulsions produced therefrom.

The use of the compounds of the invention or the emulsions produced therefrom enables good water-repellent effects to be achieved on the treated surfaces.

If compounds according to the invention which have a low average proportion of alkoxy groups per molecule are used, reduced liberation of volatile organic constituents can also be achieved.

The compounds of the invention and a process for preparing them and their use are described below by way of example without the invention being restricted to these illustrative embodiments. Where ranges, general formulae or classes of compounds are indicated below, these are intended to comprise not only the respective ranges or groups of compounds which are explicitly mentioned but also all subranges and subgroups of compounds which can be obtained by taking out individual values (ranges) or compounds. Where documents are cited in the present description, their contents are hereby fully incorporated by reference into the disclosure content of the present invention.

For the purposes of the present invention, organomodified siloxane compounds of the formula (I) include both individual compounds of this type and mixtures of such compounds. In the case of the compounds being mixtures of compounds, the indicated numbers of building blocks, e.g. particular groups or units, present in the compounds are average values averaged over all compounds present in the mixture. The siloxane units denoted by the indices o, m, n, r and s in the individual compounds can be distributed between the end groups, randomly distributed, regularly distributed or arranged as blocks. The mixtures can comprise exclusively compounds in which the siloxane units are distributed, randomly distributed, regularly distributed or arranged as blocks or comprise mixtures of one or more of these variants.

The novel organomodified siloxane compounds of the general formula (I),

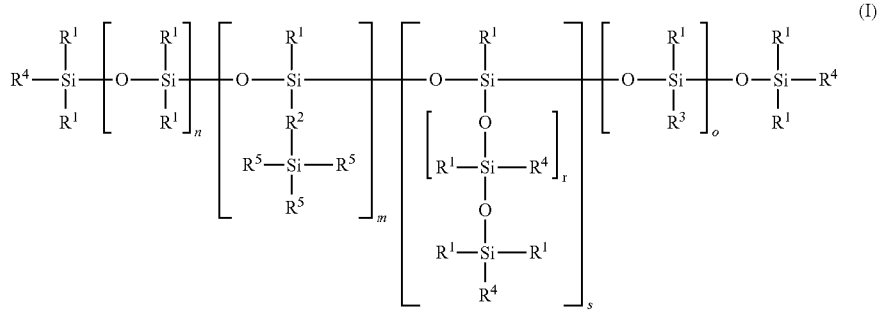

are characterized by the radicals and indices having the following meanings:

the radicals $R^1$ are identical or different radicals selected from the group consisting of linear or branched, saturated or monounsaturated or polyunsaturated alkyl, aryl, alkylaryl, arylalkyl and haloalkyl groups having from 1 to 20 carbon atoms, with the haloalkyl groups preferably having F, Cl and/or Br, more preferably F, as halogen atoms, the radicals $R^2$ are identical or different, unsubstituted or substituted organic radicals which have from 1 to 20 carbon atoms, preferably <10 carbon atoms and more preferably from 1 to 5 carbon atoms, and may contain heteroatoms, preferably oxygen and/or nitrogen atoms (such heteroatoms can, for example, be present in the form of ether, ester, alcohol, amine, urethane or amide groups), the radicals $R^3$ are organic radicals having carboxylic ester functions as shown in the formula (II),

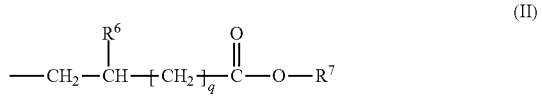

where
the radicals $R^6$ are identical or different linear or branched, saturated or monounsaturated or polyunsaturated alkyl, aryl, alkylaryl or arylalkyl radicals having from 1 to 20 carbon atoms and the radicals $R^7$ are identical or different linear or branched, saturated or monounsaturated or polyunsaturated alkyl, aryl, alkylaryl or arylalkyl radicals having from 1 to 20 carbon atoms and q is from 0 to 11, the radicals $R^4$ are each, independently of one another, $R^1$, $-R^2-Si(R^5)_3$ or $R^3$, the radicals $R^5$ are identical or different, saturated or unsaturated alkyl, alkoxy, aryl or aryloxy radicals having from 1 to 20 carbon atoms, with the proviso that at least one radical $R^5$ is an alkoxy group, n is from 1 to 200, preferably from 5 to 90, m is from 0 to 20, with the proviso that m is 0 only when $R^4$ is the radical $-R^2-Si(R^5)_3$ and otherwise m≧1, o is from 0.2 to 20, preferably from 1 to 10 and more preferably ≦5, r is from 0 to 100, preferably from 3 to 50, and s is from 0 to 5, preferably from 0 to 1, more preferably 0, 0.1, 0.2, 0.3, 0.4, 0.5, 0.6, 0.7, 0.8, 0.9 or 1, where the units denoted by the indices m, n, o, r and s can be distributed in any order in the compounds. The radicals $R^2$ are preferably alkylene radicals which may contain heteroatoms and are particularly preferably alkylene radicals which have oxygen atoms as heteroatoms or have no heteroatoms.

Preference is given to an average of ≧90% of the radicals $R^1$ in the siloxane compounds of the invention being methyl groups. The radicals $R^2$ in the siloxane compounds of the invention are preferably alkylene radicals having 1 to 5 carbon atoms. Particular preference is given to an average of ≧90% of the radicals $R^1$ in the siloxane compounds of the invention being methyl groups and the radicals $R^2$ being alkylene radicals having from 1 to 5 carbon atoms.

It can be advantageous for the siloxane compound according to the invention to have an average structure in which the index o in formula I has a value of from 1 to 5. It can likewise be advantageous for the siloxane compound according to the invention to have an average structure in which the index n in formula I has a value of from 5 to 90. It can likewise be advantageous for the siloxane compound according to the invention to have an average structure in which the index m in formula I has a value of from 0 to 10. In addition, it can be advantageous for the siloxane compound according to the invention to have an average structure in which the index q in formula II has a value of from 0 to 8. It can be particularly advantageous for the siloxane compound according to the invention to have an average structure in which the index o in formula I has a value of from 1 to 5, the index n in formula I has a value of from 5 to 100, the index m in formula I has a value of from 0 to 10 and the index q in formula II has a value of from 0 to 8. Compounds comprising siloxane units in the range of the preferred number of units have the advantage that they display a particularly good penetration behavior combined with a good repellent effect.

It can be advantageous for all radicals $R^5$ in the novel siloxane compound of the formula I to be methoxy and/or ethoxy groups. This has the advantage that good bonding of the siloxane compounds to the substrate to be impregnated is achieved in the impregnation.

If very little elimination of volatile organic compounds (low VOC value) is important in the use of the siloxane compounds of the invention, it can be advantageous for the siloxane compounds of the invention to have an average proportion of methanol and/or ethanol radicals of ≦10% by weight, preferably of 5 to 10% by weight, based on the weight average molecular weight of the siloxane compound. As a result of the use of siloxane compounds according to the invention having the above-mentioned preferred proportions of methanol/ethanol radicals, satisfactory to good bonding of the siloxane compounds to the substrate to be impregnated together with very low pollution due to liberated volatile organic compounds are achieved.

The organomodified siloxane compounds of the invention can, for example, be used for producing aqueous preparations for the impregnation of inorganic or organic substrates, in particular for producing aqueous preparations for the water-repellent impregnation of porous mineral building materials. The impregnation can be carried out using, for example, the inventive preparations described below.

The aqueous preparations of the invention, in particular for the impregnation of inorganic or organic substrates, are characterized by comprising
a) from 10 to 80 parts by weight of compounds according to any of Claims 1 to 8,
b) from 0.5 to 10 parts by weight of an emulsifier or emulsifier mixture and
c) water.

As further constituent, the aqueous compositions of the invention can contain from 0 to 0.5 part by weight of preservative. In preferred aqueous compositions, the proportion of water is from 10 to 89.5 parts by weight, preferably from 40 to 60 parts by weight.

Very particularly preferred aqueous preparations are characterized by containing
a) from 10 to 80% by weight of compounds according to any of Claims 1 to 8,
b) from 0.5 to 10 parts by weight of an emulsifier or emulsifier mixture,
c) from 10 to 89.5% by weight of water and, if appropriate,
d) from 0 to 0.5% by weight of preservative.

All known emulsifiers can be present as emulsifiers in the compositions of the invention. The aqueous preparations preferably contain one or more compounds from the group consisting of nonionic emulsifiers, e.g. addition products of alkylene oxides, preferably ethylene oxide, onto compounds having active hydrogen, e.g. fatty alcohols, alkylphenols such as octylphenol, nonylphenol or dodecylphenol, as emulsifiers. The content of oxyethylene units should preferably be sufficiently high for the HLB of the emulsifiers to be from 6 to 20, in particular from 10 to 18.

The aqueous preparations can be used directly or be brought to the desired use concentrations by simple dilution with water. These desired concentrations are dependent on the type of building materials to be hydrophobicized, in particular on their porosity or their absorbency.

Particular preference is given to using aqueous preparations which have a concentration of novel compounds of the formula I of from 5 to 20% by weight, preferably from 10 to 15% by weight.

The compounds of the invention, in particular the aqueous preparations and/or the formulations diluted to the use concentration, in principle enable all inorganic or organic substrates to be impregnated, i.e. hydrophobicized.

According to the invention, preferred substrates to be treated are mineral or wood-containing materials and finished parts and also products produced therefrom, for example bricks, slabs, tiles, mortars, concrete compositions or insulating materials for thermal or acoustic insulation.

It is in principle possible to use all preservatives known in the prior art. According to the invention, preference is given to using products of the group: combinations of heterocycles and methylol derivatives (for example N-methylolchloroacetamide, 5-chloro-2-methyl-2-isothiazol-3-one) and mixtures of hemiacetals with nonhazardous components (for example [1,2-ethanediylbis(oxy)]bismethanol).

The emulsion of the invention can be produced in a known way. The emulsions of the invention are preferably produced by emulsifying the constituents a), b) and, if appropriate, d) separately or emulsifying a mixture of the constituents.

Preference is given to adding the emulsifier or emulsifiers to the component to be emulsified (or to a mixture thereof) and, if appropriate, heating the emulsifier-containing mixture. The water c) is then added to this mixture while stirring well. The emulsion formed or being formed can be homogenized by means of suitable stirring apparatuses which preferably operate according to the rotor/stator principle. It is also possible to use colloid mills for reducing the particle size of the emulsified phase.

The following examples illustrate the present invention without restricting its scope of protection which is defined by the description and the claims.

EXAMPLES

Abbreviations having the following meanings are used below:
$M=-O_{1/2}-Si-(CH_3)_3$,
$M'=-O_{1/2}-Si-(CH_3)_2H$,
$D=-Si(CH_3)_2O_{2/2}-$,
$D'=-Si(H)(CH_3)O_{2/2}-$,
N=total chain length of the Si chain (average number of Si atoms linked by Si—O—Si bonds per molecule).

The SiH-siloxanes used in the examples were, as described in "Silicones Chemistry and Technology" published by Vulkan-Verlag, Essen, prepared by equilibration. Here, the SiH-siloxanes used in the examples were prepared by equilibrating mixtures having the compositions indicated in Table 1:

TABLE 1

| | Compositions of the mixtures used in the equilibration (figures in % by weight) | | |
|---|---|---|---|
| | SiH—siloxane of Examples 1 and 2 in % | SiH—siloxane of Example 3 in % | SiH—siloxane of Example 4 In % |
| $M'-D_8-M'$ | 0 | 0 | 0 |
| $M-D'_{48}-M$ | 16 | 22.3 | 9.2 |
| Cyclo-$D_4$ | 76.7 | 67.5 | 89.1 |
| M-M | 7.3 | 10.2 | 1.7 |

Example 1

Preparation of an Organomodified Siloxane Compound

Reaction of a central SiH-siloxane (N=27.5, $M-D_{20.5}-D'_5-M$) with isobutyl methacrylate (i-BMA, Degussa GmbH), 1-hexadecene (Gulftene 16, Chevron) and vinyltriethoxysilane (Dynasilan® VTEO, Degussa GmbH) using a Pt-containing Karstedt catalyst (Heraeus).

130 g of the SiH-siloxane, 17 g of isobutyl methacrylate, 25 g of 1-hexadecene and Karstedt catalyst (10 ppm of Pt based on the mixture) are placed in an apparatus comprising a 500 ml three-necked flask, thermometer, stirrer and dropping funnel and heated to 80° C. The resulting exothermic reaction leads to a temperature rise to about 103° C. After 3 hours, 28 g of vinyltriethoxysilane are added dropwise over a period of 3 hours, with the temperature not being allowed to exceed 110° C. After the addition is complete, the mixture is heated at 110° C. for another one hour to allow further reaction. Distilling off the volatile compounds and filtration gives a clear, slightly yellowish liquid which contains a mixture of siloxanes whose average molecular structure corresponds to the formula (Ia).

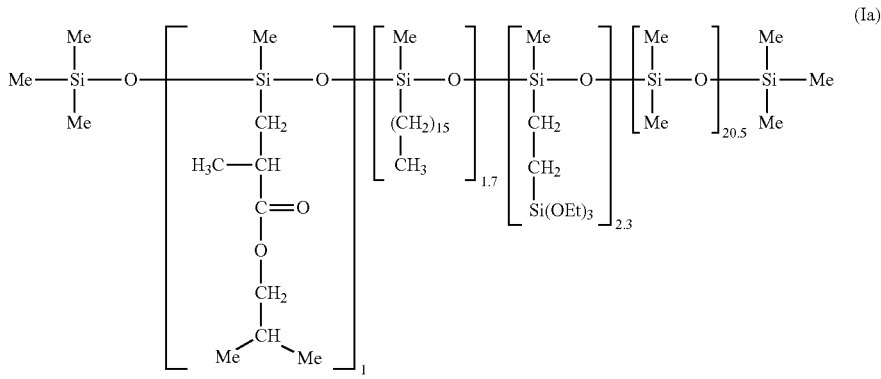

Example 2

Preparation of an Organomodified Siloxane Compound

Reaction of a central SiH-siloxane (N=27.5, $M-D_{20.5}-D'_5-M$) with 1-hexadecene (Gulftene 16, Chevron), methyl undecylenoate (ME U11, Impaq) and vinyltriethoxysilane (Dynasilan® VTEO, Degussa GmbH) using a Pt-containing catalyst.

246 g of the SiH-siloxane, 52.5 g of 1-hexadecene, 26 g of methyl undecylenoate and Karstedt catalyst (10 ppm of Pt based on the mixture) were placed in an apparatus as described in Example 1 and heated to 80° C. The resulting exothermic reaction led to a temperature rise to about 110° C. After 3 hours, 71 g of Dynasilan® VTEO were added dropwise over a period of 3 hours, with the temperature not being allowed to exceed 110° C. After the addition was complete, the mixture was heated at 110° C. for another one hour to allow further reaction.

Distilling off the volatile compounds and filtration gave a clear, colourless liquid which contained a mixture of siloxanes whose average molecular structure corresponds to the formula (Ib). The molecular structure was determined by means of NMR and GPC.

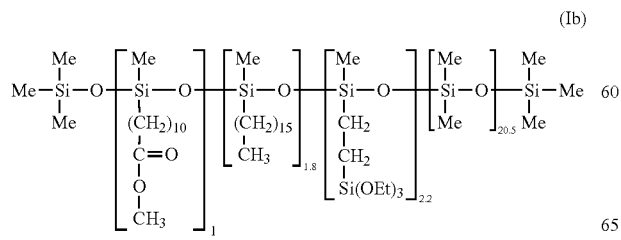

Example 3

Preparation of an Organomodified Siloxane Compound

Reaction of a central SiH-siloxane (N=20, $M-D_{13}-D'_5-M$) with 1-hexadecene (Gulftene 16, Chevron), methyl undecylenoate (ME U11, Impaq) and vinyltrimethoxysilane (Dynasilan® VTMO, Degussa GmbH) using a Pt-containing catalyst.

246 g of the SiH-siloxane, 61 g of 1-hexadecene, 34 g of methyl undecylenoate and Karstedt catalyst (10 ppm of Pt based on the mixture) were placed in an apparatus as described in Example 1 and heated to 80° C. The resulting exothermic reaction led to a temperature rise to about 110° C. After 3 hours, 79 g of Dynasilan® VTMO were added dropwise over a period of 3 hours, with the temperature not being allowed to exceed 110° C. After the addition was complete, the mixture was heated at 110° C. for another two hours to allow further reaction.

Distilling off the volatile compounds and filtration gave a clear, colourless liquid which contained a mixture of siloxanes whose average molecular structure corresponds to the formula (Ic). The average molecular structure was determined as described in Example 2.

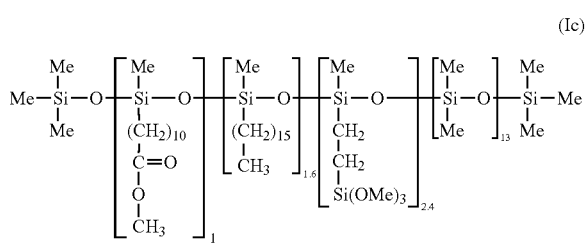

Example 4

Preparation of an Organomodified Siloxane Compound

Reaction of a central SiH-siloxane (N=100, $M-D_{87.5}-D'_{10.5}-M$) with methyl undecylenoate (ME U11, Impaq), methyl methacrylate (MMA, Degussa GmbH) and vinyltriethoxysilane (Dynasilan® VTEO, Degussa GmbH) using a Pt-containing catalyst.

160 g of the SiH-siloxane, 9 g of methyl undecylenoate, 4.5 g of methyl methacrylate and Karstedt catalyst (10 ppm of Pt based on the mixture) are placed in an apparatus as used in Example 1 and heated to 80° C. The resulting exothermic reaction leads to a temperature rise to about 100° C. 35 g of vinyltriethoxysilane are subsequently added dropwise over a period of 1 hour, with the temperature not being allowed to exceed 110° C. After the addition is complete, the mixture is heated at 110° C. for another 2 hours to allow further reaction. Distilling off the volatile compounds and filtration gives a clear, colourless liquid.

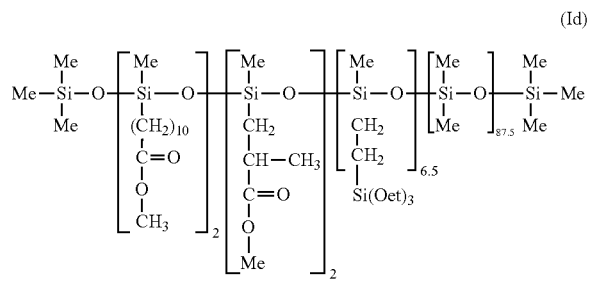

Example 5

Production of the Emulsions for the Use Tests 19 g of an emulsifier mixture comprising an ethoxylated triglyceride having an HLB of 18 and an ethoxylated fatty alcohol having an HLB of 11 in a weight ratio of 6:4 were dissolved in 479 g of water while stirring by means of a high-speed stirrer disc. The organomodified siloxane compound from Example 2 was added to such a solution for one example (Example 5a) and the organomodified siloxane compound from Example 3 was added to such a solution for the other example (Example 5b). In each case, the organomodified siloxane compound was added in such an amount that a mixture containing 50% by weight of siloxane compound was obtained. The mixtures obtained were stirred and processed to produce a stable emulsion by means of an emulsifying machine (slit homogenizer).

Example 6

Use Tests

To test the emulsions in use, the repellent effect was assessed, the water absorption was determined by a method based on DIN 52103 and the penetration depth was determined on five impregnated lime-sand bricks.

The formulations produced in Example 5 were tested according to the following test procedure. The results of the use tests on the product samples are listed in Tables 2 to 4.
Materials and Reagents Used:
Test specimens: lime-sand bricks (silica facing fillers, fracture-rough, procured from Traxel Ziegel, Dortmund), preclinker (Terca®-Kijwaard hand moulding facing bricks 5543, procured from Traxel ziegel, Dortmund) and concrete B35.
The bricks were cut to the following format:
20 mm×70 mm×55 mm
Building protection emulsion (50% strength by weight) from Example 5:
100 g,
Mains water: 400 g,
Laboratory balance (0.1 g scale),
Immersion vessel with plastic mesh (130 mm×90 mm×90 mm; B×H×T),
water bath with plastic mesh,
crucible tongs,
stopwatch.

Example 6a

Cleaning and Conditioning of the Test Specimens

The cut test specimens were irrigated at room temperature for 24 hours and cleaned with water and a brush until all dust had been removed. The cleaned test specimens were subsequently dried at about 105° C./24 hours in a drying oven and then stored at room temperature (about 23° C.) in a controlled-atmosphere chamber at an atmospheric humidity of 50% relative atmospheric humidity until the weight was constant.

Example 6b

Impregnation of the Bricks

The cleaned and conditioned test specimens were immersed for one minute in the ready-to-use solution (containing 10% by weight of the compounds of the general formula (I)). The supernatant liquid should have a height of about 10-15 mm. The impregnated bricks were taken from the bath by means of the crucible tongs and air dried at room temperature on a mesh for 7 days.

Example 6c

Determination of the Repellent Effect

To determine the repellent effect, 0.5 ml of distilled water was placed by means of a pipette on the surface of the brick one day, 7 days and if appropriate 14 days after impregnation. The outlet of the pipette should gently touch the surface so that the drop does not run to the side. After 10 minutes, the drop of water was shaken off and the repellent effect was subsequently assessed. The quality of the repellent effect was assessed according to the criteria indicated below. The repellent effect was determined on all test specimens and the mean was subsequently calculated.
Assessment Criteria for the Repellent Effect:
0 The drop of water cannot be placed on the surface of the brick.
1 The drop of water is not soaked up; no wetting of the surface by the drop.
2 The drop of water is not soaked up; about half of the surface of the brick under the drop of water is wetted.
3 The drop of water is not soaked up; the surface of the brick under the drop of water is fully wetted.
4 Less than 10% of the drop of water has been soaked up; dark coloration of the surface of the brick under the drop of water.
5 50% of the drop of water has been soaked up.
6 The drop of water has been completely soaked up.
A product sample displays a good repellent effect when it achieves a grade of at least 3 after 7 days.

Example 6d

Determination of the Water Absorption

The determination of the water absorption is carried out only after the test specimens have been stored for a sufficiently long time for a repellent effect of ≦4 to be obtained. After storage for 7 days (concrete) or 14 days (lime-sand brick and clinker) on a mesh at room temperature, the test specimens were weighed to determine the weight $M_1$ and subsequently placed in a water bath. The bath provided for this purpose was lined with a plastic mesh. The height of water above the brick was set to 50 mm. After 24 hours, the bricks were taken from the water bath. Adhering surface water was removed with cleaning paper. The test specimen was subsequently weighed to determine the weight $M_2$. A blank is always determined at the same time.

Formula for Calculating the Water Absorption ($W_A$)

$$\frac{(M_2 - M_1) * 100}{M_1} = W_A$$

The result is reported in % by weight. The reduction in the water absorption after 24 hours should be at least 70% based on the blank.

Example 6e

Determination of the Penetration Depth

After determination of the water absorption, the test specimens were dried overnight at 105° C. and subsequently split by means of a hammer. The fracture surfaces were wetted with water. The places which have not been impregnated appear dark, while the impregnated hydrophobic zones are not wetted and appear light in colour. The penetration depth is determined by measuring the zones which appear light in colour and is reported in mm. If a widely differing penetration depth is found for one test specimen, the arithmetic mean should be calculated.

TABLE 2

Results of the use tests on the concrete B-35 specimen

| Building protection emulsion obtained from emulsion of | Repellent effect [0 = good to 6 = poor] | Penetration depth [mm] | Water absorption after storage under water pressure [%] |
| --- | --- | --- | --- |
| Example 5a | 3 | 3.3 | 1.1 (reduction by 80%) |
| Example 5b | 3 | 2.3 | 1.0 (reduction by 82%) |
| Blank | 6 | — | 5.8 |

Storage under water pressure means storage under a height of water of 50 mm

TABLE 3

Results of the use tests on the lime-sand brick specimen

| Building protection emulsion obtained from emulsion of | Repellent effect [0 = good to 6 = poor] | Penetration depth [mm] | Water absorption after storage under water pressure [%] |
| --- | --- | --- | --- |
| Example 5a | 2 | 3.5 | 1.2 (reduction by 92%) |

TABLE 3-continued

Results of the use tests on the lime-sand brick specimen

| Building protection emulsion obtained from emulsion of | Repellent effect [0 = good to 6 = poor] | Penetration depth [mm] | Water absorption after storage under water pressure [%] |
| --- | --- | --- | --- |
| Example 5b | 1 | 3.2 | 1.2 (reduction by 92%) |
| Blank | 6 | — | 15.4 |

TABLE 4

Results of the use tests on the Terca ® clinker specimen

| Building protection emulsion obtained from emulsion of | Repellent effect [0 = good to 6 = poor] | Penetration depth [mm] | Water absorption after storage under water pressure [%] |
| --- | --- | --- | --- |
| Example 5a | 2.7 | >10 | 1.1 (reduction by 92%) |
| Example 5b | 2 | >10 | 1.3 (reduction by 90%) |
| Blank | 6 | — | 13.5 |

As can be seen from Tables 2 to 4, a very good repellent effect, a good penetration depth and a low water absorption are achieved after treatment with the organomodified siloxane compounds of the invention. It was thus able to be shown that the organomodified siloxane compounds of the invention are highly suitable for producing preparations for the water-repellent impregnation of materials.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:

1. An organomodified siloxane compound of the general formula (I),

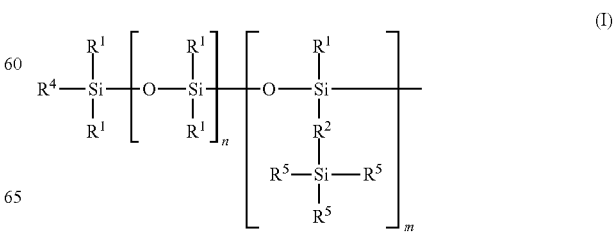

-continued

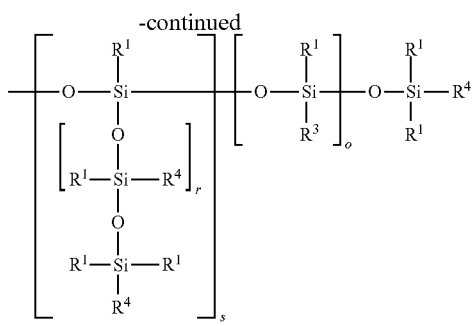

where
the radicals $R^1$ are identical or different radicals selected from the group consisting of linear or branched, saturated or monounsaturated or polyunsaturated alkyl, aryl, alkylaryl, arylalkyl and haloalkyl groups having from 1 to 20 carbon atoms,
the radicals $R^2$ are identical or different organic radicals which have from 1 to 20 carbon atoms and may contain heteroatoms,
the radicals $R^3$ are organic radicals having carboxylic ester functions as shown in the formula (II),

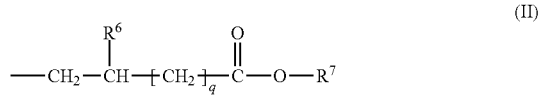 (II)

where
the radicals $R^6$ are identical or different linear or branched, saturated or monounsaturated or polyunsaturated alkyl, aryl, alkylaryl or arylalkyl radicals having from 1 to 20 carbon atoms and
the radicals $R^7$ are identical or different linear or branched, saturated or monounsaturated or polyunsaturated alkyl, aryl, alkylaryl or arylalkyl radicals having from 1 to 20 carbon atoms and
q is from 0 to 11,
the radicals $R^4$ are each, independently of one another, $R^1$, $-R^2-Si(R^5)_3$ or $R^3$,
the radicals $R^5$ are identical or different, saturated or unsaturated alkyl, alkoxy, aryl or aryloxy radicals having from 1 to 20 carbon atoms, with the proviso that at least one radical $R^5$ is an alkoxy group,
n is from 1 to 200,
m is from 0 to 20, with the proviso that m is 0 only when $R^4$ is the radical $-R^2-Si(R^5)_3$ and otherwise $m \geq 1$,
o is from 1 to 20,
r is from 0 to 100,
s is from 0 to 5,
where the units denoted by the indices m, n, o, r and s can be distributed in any order in the compounds.

2. The compound of claim 1, characterized in that an average of $\geq 90\%$ of the radicals $R^1$ are methyl groups and $R^2$ is an alkylene radical having from 1 to 5 carbon atoms.

3. The compound of claim 1, characterized in that o has a value of from 1 to 5.

4. The compound of claim 1, characterized in that all radicals $R^5$ are methoxy and/or ethoxy groups.

5. The compound according to claim 1, characterized in that n has a value of from 5 to 100.

6. The compound of claim 1, characterized in that q has a value of from 0 to 8.

7. The compound of claim 1, characterized in that m has a value of from 0 to 10.

8. The compound of claim 1, characterized in that the compounds have an average proportion of methanol and/or ethanol radicals of $\leq 10\%$ by weight, based on the weight average molecular weight of the siloxane compounds.

9. The compound of claim 8, have an average proportion of methanol and/or ethanol radicals from 5 to 10% by weight, based on the weight average molecular weight of the siloxane compounds.

10. The compound of claim 1, wherein:
an average of $\geq 90\%$ of the radicals $R^1$ are methyl groups;
$R^2$ is an alkylene radical having from 1 to 5 carbon atoms;
all radicals $R^5$ are methoxy and/or ethoxy groups;
m has a value of from 0 to 10;
n has a value of from 5 to 100;
o has a value of from 1 to 5;
q has a value of from 0 to 8; and
have an average proportion of methanol and/or ethanol radicals from 5 to 10% by weight, based on the weight average molecular weight of the siloxane compounds.

11. A method for producing aqueous preparations for the water-repellent impregnation of inorganic or organic substrates which comprises adding the compounds of claim 1 to an aqueous preparation.

12. A method for producing aqueous preparations for the water-repellent impregnation of porous mineral building materials which comprises adding the compounds of claim 1 to an aqueous preparation.

13. An aqueous preparation for the water-repellent impregnation of inorganic or organic substrates, which comprise
a) from 10 to 80 parts by weight of compounds according to claim 1,
b) from 0.5 to 10 parts by weight of an emulsifier or emulsifier mixture and
c) water.

14. The aqueous preparation according to claim 13, characterized in that it contains from 0 to 0.5 part by weight of preservative.

15. The aqueous preparation according to claim 13, characterized in that the proportion of water is from 10 to 89.5 parts by weight.

16. The aqueous preparation according to claim 13, characterized in that they comprise
a) from 10 to 80% by weight of compounds according to claim 8,
b) from 0.5 to 10% by weight of an emulsifier or emulsifier mixture,
c) from 10 to 89.5% by weight of water and, if appropriate,
d) from 0 to 0.5% by weight of preservative.

17. A composition comprising a mixture of the organomodified siloxane compounds of claim 1.

* * * * *